Patented Apr. 10, 1934

1,954,619

UNITED STATES PATENT OFFICE 1,954,619

MERCURATED ISATIN DERIVATIVES

Walter G. Christiansen, Glen Ridge, N. J., and Sidney E. Harris, Brooklyn, N. Y., assignors to E. R. Squibb & Sons, Brooklyn, N. Y., a corporation of New York No Drawing. Application May 25, 1932,
Serial No. 613,542

6 Claims. (Cl. 260—13)

This invention relates to mercurated isatin derivatives, methods of preparing these compounds and antiseptic preparations containing them. More particularly, it relates to mercurated isatin phenol condensation products, such as mercurated substituted diphenol isatin derivatives and mercurated substituted diresorcin isatin derivatives.

The invention relates particularly to mercurated isatin derivatives which have antiseptic properties. When used as antiseptics we prefer to employ the mercurials in an alkaline solution. They may be prepared in the form of different salts but on solution in alkali these are converted to hydroxy mercury derivatives and are used in this form. Although the invention includes various salts and the methods of their preparation, the corresponding hydroxy derivatives are more important from the standpoint of use and can be derived from the salts by solution in aqueous sodium hydroxide.

The mercurated isatin phenol condensation products of this invention are compounds in which the carbon atom of isatin which is connected with the benzene nucleus is also connected with at least one other hydroxy-aryl group. One or more of the hydrogens of each hydroxy-aryl group may be replaced by a halogen such as bromine or by a group such as the nitro group. In addition, one of the hydrogens may be replaced by an alkyl group or a phenyl group.

Mercurated diresorcin isatin derivatives are of two types, namely, the open type in which each of the resorcin nuclei contains two hydroxyl groups, and the closed type in which one of the hydroxyl groups of each of the two resorcin nuclei is replaced by one oxygen atom which is connected with each group.

We do not know just how the mercury of the compounds of this invention is attached to the rest of the molecule and we do not wish to be bound by any theory advanced regarding its position. It may enter an unsubstituted position of an hydroxylated nucleus or it may enter the benzene ring of the isatin portion of the molecule.

The following examples give details of a method of preparing several mercurated isatin derivatives which we have found to have bacteriostatic or bactericidal properties.

Example 1

*Dihydroxy mercury 3,3' dibromo diphenol isatin-(3,3)*

3.17 gms. of diphenol isatin is suspended in 40 cc. of glacial acetic acid and a solution of 3.2 gms. of bromine in 10 cc. of glacial acetic acid is slowly added to the well-stirred suspension. This mixture which has become homogeneous during the addition of the bromine and acid is warmed on a water bath for a short time and is then diluted with 500 cc. of water. The dibromo diphenol isatin which precipitates is washed free of acid by means of water, dried in a vacuum and recrystallized from benzene.

3.5 gms. dibromo diphenol isatin are dissolved in 50 cc. of alcohol and heated to boiling. To the boiling solution is added a filtered hot solution of 4.7 gms. of mercuric acetate in 20 cc. of water containing a small quantity, say 0.2 cc. of acetic acid. The mixture is boiled for about two hours or until the solution no longer contains inorganic mercury. The cooled solution is filtered and the precipitate of diacetoxy mercury 3,3' dibromo diphenol isatin is washed with alcohol and ether and dried in vacuo, or by exposure to air. It is a pale yellowish sandy powder, insoluble in water and the common organic solvents but soluble in dilute alkalies, including ammonium hydroxide. It may be converted to di-hydroxy mercury 3,3' dibromo diphenol isatin by solution in aqueous sodium hydroxide.

The following formula is suggested:

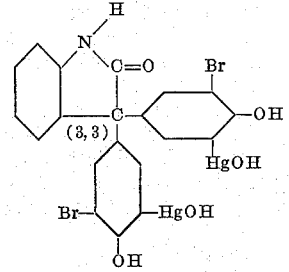

Example 2

*Mono hydroxy mercury 3,3' dimethyl 5,5' dibromo diphenol isatin-(3,3)*

48 grams of diphenol isatin are suspended in 480 ccs. of glacial acetic acid and 97 grams of bromine are added dropwise. The diphenol isatin rapidly goes into solution and the temperature rises to 40–45°. After the addition is complete the mixture is allowed to stand for one hour and then poured into three liters of water. The precipitate of tetrabromo diphenol isatin which forms is filtered off, washed free of acid with water and dried.

91 grams of tetrabromo diphenol isatin are dissolved in 144 ccs. of 2-n-KOH and the solution diluted with 500 ccs. of water. To the boiling solution a solution of 46 grams of mercuric acetate in 20 ccs. of n-acetic acid and 150 ccs. of water is added in a slow stream. The mixture is boiled until a test for inorganic mercuric ions is negative. The thick bluish precipitate of mono acetoxy mercury tetrabromo diphenol isatin which has formed is then filtered off, washed free of acetic acid with water and dried. The product is a bluish-green powder insoluble in organic solvents and water but soluble in dilute alkalies including ammonium hydroxide. It may be converted to the mono hydroxy mercury tetrabromo diphenol isatin by solution in aqueous sodium hydroxide.

The following formula is suggested:

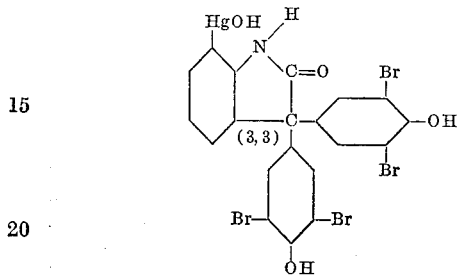

EXAMPLE 3

*Dihydroxy mercury 3,3' dinitro diphenol isatin-(3,3)*

3.17 gms. of diphenol isatin are suspended in 25 cc. of glacial acetic acid. 1.5 cc. of nitric acid (specific gravity 1.4) are added with brisk stirring. The diphenol isatin rapidly dissolves and the deep orange solution is warmed for a short time on a water bath. The solution is then diluted with 400 cc. of water and 5 gms. of sodium chloride are added to coagulate the product. The nitro derivative thus obtained is filtered off, washed with water, dried in a vacuum and recrystallized from alcohol.

10 gms. dinitro-diphenol isatin are dissolved in 200 ccs. of alcohol and heated to boiling. To the boiling solution is slowly added a hot filtered solution of 15 gms. mercuric acetate in 50 ccs. of water containing a small amount say 0.2 ccs. of glacial acetic acid. The mixture is boiled and stirred for five hours and the precipitated product is then filtered off washed with alcohol and ether and may be dried by exposure to air. The diacetoxy mercury 3,3' dinitro diphenol isatin thus obtained may be converted into di-hydroxy mercury 3,3' dinitro diphenol isatin by solution in aqueous sodium hydroxide.

The following formula is suggested:

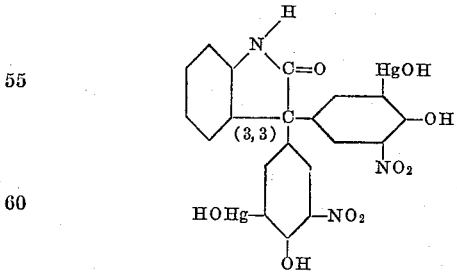

EXAMPLE 4

*Mono hydroxy mercury 3,3' dimethyl 5,5' dibromo diphenol isatin-(3,3)*

13 gms. of di-ortho cresol isatin are dissolved in 125 cc. of glacial acetic acid and 13 gms. of bromine are added slowly with stirring. The mixture is allowed to stand for some time during which a micro crystalline powder is precipitated. This is removed and may be washed with acetic acid, alcohol and ether and then dried.

5 gms. dibromo di-o-cresol isatin are dissolved in 80 ccs. of alcohol and the solution heated to boiling. To the boiling solution is added with stirring a solution of 3 gms. mercuric acetate in 20 ccs. of water containing a small amount, say 0.1 cc. acetic acid. The mixture is boiled and stirred for 20 hours and then filtered hot. The precipitate is repeatedly extracted with hot absolute alcohol and is finally washed with ether and dried by exposure to warm air. The mono acetoxy mercury 3,3' dimethyl 5,5' dibromo diphenol isatin is an amorphous sandy powder, insoluble in the common organic solvents and in water but soluble in dilute alkalies including ammonium hydroxide. It may be converted to the monohydroxy derivative by solution in sodium hydroxide.

The following formula is suggested:

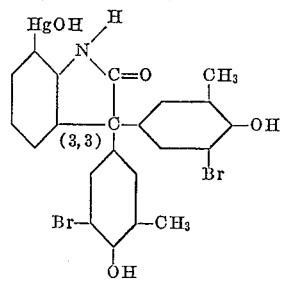

EXAMPLE 5

*Diacetoxy mercury 3,3' dimethyl 5,5' dinitro diphenol isatin-(3,3)*

24 gms. of di-ortho cresol isatin are dissolved in 250 cc. of glacial acetic acid. 10 cc. of nitric acid is slowly added with stirring. The mixture develops heat and is stirred for fifteen minutes after which time it is poured into 150 cc. of cold water. The bright yellow precipitate is filtered off and washed free of acid with water.

The diacetoxy mercury compound is formed by dissolving the dinitro di-o-cresol isatin in alcohol and adding to the solution mercuric acetate and a small amount of glacial acetic acid. The mixture is boiled and stirred for several hours and the precipitate is then filtered off and washed and dried. Di hydroxy mercury 3,3' dimethyl 5,5' dinitro diphenol isatin is prepared by dissolving the diacetoxy mercury compound in sodium hydroxide.

One of the following formulæ is suggested for this compound:

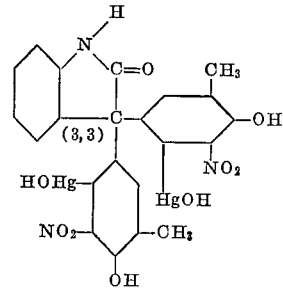

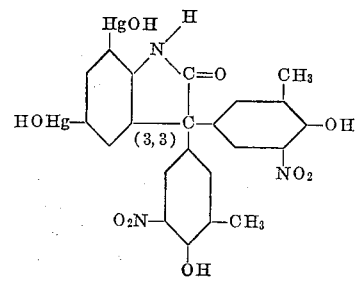

Example 6

*Mono hydroxy mercury 3,3' diphenyl 5,5' dibromo diphenol isatin-(3,3)*

31 gms. of di-ortho phenyl phenol isatin are dissolved in 300 cc. of alcohol and 20.5 gms. of bromine are added slowly with stirring. The mixture is allowed to stand for a short time and is then diluted with 1500 cc. of water. The precipitate is washed several times by decantation with water and is then filtered and washed free of acid on the filter and then dried in a vacuum.

The dibromo di-o-phenyl phenol isatin is dissolved in alcohol and heated to boiling. To the boiling solution is added the required amount of mercuric acetate and a small amount of acetic acid. The mixture is boiled and stirred for several hours and the precipitate is filtered off, washed and dried. Mono hydroxy mercury 3,3' diphenyl 5,5' dibromo diphenol isatin is formed by dissolving this mono acetoxy compound in aqueous sodium hydroxide.

The following formula is suggested:

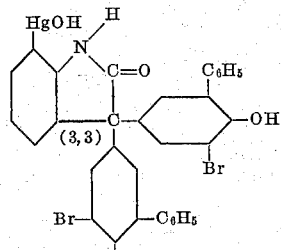

Example 7

*Dihydroxy mercury 3,3' diphenyl 5,5' dibromo diphenol isatin-(3,3)*

Dibromo di-o-phenyl phenol isatin prepared as in Ex. 6 is dissolved in alcohol and heated to boiling. To the boiling solution is added an excess of mercuric acetate in a water solution containing a small amount of acetic acid. The mixture is boiled for several hours and the precipitated product is then filtered off, washed and dried. From this diacetoxy derivative the dihydroxy compound is formed by solution in aqueous sodium hydroxide.

The following formula is suggested:

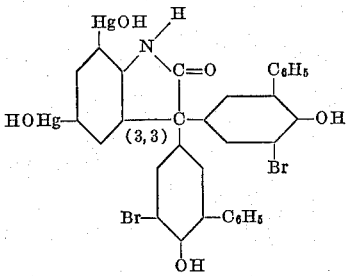

Example 8

*Dihydroxy mercury 3,3' diphenyl 5,5' dinitro diphenol isatin-(3,3)*

4.7 gms. of di-ortho phenyl phenol isatin is suspended in 25 cc. of glacial acetic acid; 1.5 cc. of nitric acid is added with stirring. The mixture is heated for a short time on the water bath to complete the reaction and is then treated with 600 cc. of water. The precipitated nitro compound is filtered off and then washed with water, dried in a vacuum and recrystallized from alcohol.

3 gms. dinitro di-o-phenyl phenol isatin are suspended in 25 ccs. hot alcohol and to the boiling suspension a solution of 3.4 gms. mercuric acetate in 10 ccs. water is added. The mixture is boiled and very briskly agitated for ten hours and then filtered. The precipitated product thus obtained is washed with alcohol and ether and dried in vacuo, or by exposure to air. The product is an amorphous yellow sandy powder which is soluble in dilute alkalies including ammonium hydroxide and insoluble in water and common solvents. This diacetoxy mercury compound is converted to the dihydroxy mercury compound by solution in aqueous sodium hydroxide.

One of the following formulæ is suggested for this compound:

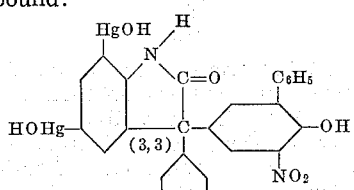

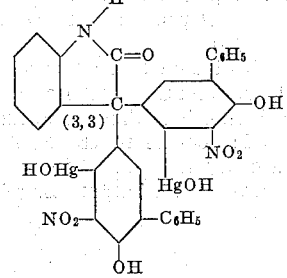

Example 9

*Dihydroxy mercury 5,5' dibromo diresorcin isatin-(3,3)*

7 gms. of diresorcin isatin are dissolved in 25 cc. glacial acetic acid and a solution 6.3 gms. of bromine in 10 cc. of glacial acetic acid are slowly added with stirring. The mixture is allowed to stand for a short time and is then poured into 500 cc. of water. The precipitate of dibromo diresorcin isatin is filtered off and washed and dried at about 60° C.

2 gms. dibromo diresorcin isatin are dissolved in 30 ccs. of alcohol and heated to boiling. To the boiling solution is added a solution of 2.5 gms. mercuric acetate in 10 ccs. of water containing a small quantity of acetic acid say 0.1 cc. The mixture is boiled till mercuric ions are no longer present which usually takes about ½-¾ of an hour. The product is filtered, washed with alcohol and ether and may be dried in vacuo. The dihydroxy mercury compound is formed by dissolving this diacetoxy derivative in aqueous sodium hydroxide.

The following formula is suggested:

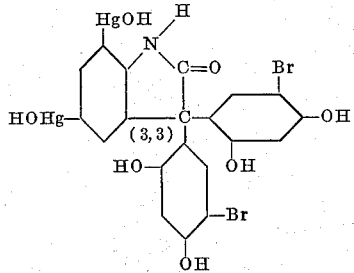

Example 10

*Mono hydroxy mercury 5,5' dinitro diresorcin isatin-(3,3)*

The following formula is suggested:

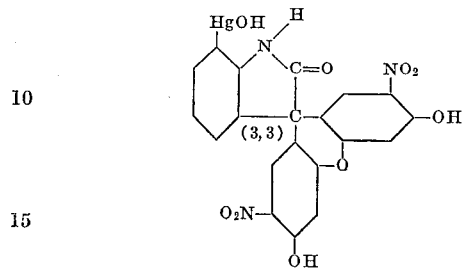

5 gms. of diresorcin isatin are dissolved in 20 cc. of concentrated sulfuric acid and the mixture is cooled to 0° C. To the well stirred mixture is added a previously cooled nitrating mixture of 2.8 cc. of nitric acid and 3.5 cc. of sulfuric acid, the addition being so slow that the temperature remains at about 0° C. The mixture is maintained at this temperature for one hour with stirring and is then diluted with 100 cc. of ice water. The precipitate of dinitro diresorcin isatin is filtered off, then washed with cold water and dried in a vacuum.

4.2 gms. dinitro-diresorcin isatin are dissolved in 50 cc. N.NaOH and heated to boiling. To the hot solution is added a boiling solution of 6 gms. mercuric acetate in 25 cc. of water containing a little acetic acid. After boiling a few minutes, 75 cc. water and an excess dilute sulfuric acid is added. The precipitated product is filtered, washed with water and dried in warm air current.

For the treatment of bacteria we prefer to dissolve a small amount, for example, 1 or 2% of the mercurial in aqueous sodium hydroxide to which other chemicals may be added such as alcohol, acetone, sulfo-oleic acid, etc. For example, a one percent solution of mono hydroxy mercury 3,3', 5,5' tetra bromo diphenol isatin made with 55 cc. of normal sodium hydroxide per liter was found to be effective against typhoid bacilli in a dilution of 1 to 25 in about five minutes and in a dilution of 1 to 200 in about ten minutes; and a two percent solution of the same mercurial made with ½ of 1% of sulfo-oleic acid and 60 cc. of normal sodium hydroxide per liter was effective against staphylococcus aureus in a dilution of 1 to 25 in about five minutes and in a dilution of 1 to 50 in about ten minutes.

We claim:

1. A mercurated di(hydroxy phenyl) isatin-(3,3).
2. A mercurated diphenol isatin-(3,3).
3. A mercurated substituted di(hydroxy phenyl) isatin-(3,3).
4. Mono hydroxy mercury 3,3', 5,5' tetrabromo diphenol isatin-(3,3).
5. Mono hydroxy mercury 3,3' dimethyl 5,5' dibromo diphenol isatin-(3,3).
6. Di-hydroxy mercury 5,5' dibromo diresorcin isatin-(3,3).

WALTER G. CHRISTIANSEN.
SIDNEY E. HARRIS.